(12) United States Patent
Satpathy et al.

(10) Patent No.: US 9,699,096 B2
(45) Date of Patent: Jul. 4, 2017

(54) PRIORITY-BASED ROUTING

(71) Applicants: Sudhir Satpathy, Hillsboro, OR (US);
Himanshu Kaul, Portland, OR (US);
Mark Anders, Hillsboro, OR (US);
Sanu Mathew, Hillsboro, OR (US);
Gregory Chen, Hillsboro, OR (US);
Ram Krishnamurthy, Portland, OR (US)

(72) Inventors: Sudhir Satpathy, Hillsboro, OR (US);
Himanshu Kaul, Portland, OR (US);
Mark Anders, Hillsboro, OR (US);
Sanu Mathew, Hillsboro, OR (US);
Gregory Chen, Hillsboro, OR (US);
Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 14/141,356

(22) Filed: Dec. 26, 2013

(65) Prior Publication Data
US 2015/0188829 A1 Jul. 2, 2015

(51) Int. Cl.
*H04L 12/833* (2013.01)
*H04L 12/725* (2013.01)
(Continued)

(52) U.S. Cl.
CPC .......... *H04L 47/2458* (2013.01); *H04L 45/30* (2013.01); *H04L 47/6275* (2013.01); *H04L 49/109* (2013.01); *H04L 47/56* (2013.01)

(58) Field of Classification Search
CPC ..... H04L 49/90; H04L 47/10; H04L 12/5693; H04L 49/254; H04L 2012/5681; H04L 49/3027; H04L 12/5601; H04L 2012/5651; H04L 47/2458; H04L 45/30; H04L 47/6275; H04L 49/109
(Continued)

(56) References Cited

U.S. PATENT DOCUMENTS 5,909,443 A * 6/1999 Fichou ............... H04Q 11/0478
370/236
6,975,630 B1 * 12/2005 Kusumoto .......... H04L 12/5601
370/395.41

(Continued)

OTHER PUBLICATIONS

Anders et al., A 2.9Tb/s 8W 64-Core Circuit-switched Network-on-Chip in 45nm CMOS, Circuit Research Lab, Intel Corporation, 2008, 4 pages, Hillsboro, OR, USA.
(Continued)

*Primary Examiner* — Ronald B Abelson
(74) *Attorney, Agent, or Firm* — International IP Law Group, P.L.L.C.

(57) ABSTRACT

Disclosed herein is a router configured for priority-based routing. The router is configured to receive a plurality of packets, wherein each packet is assigned a priority value. The router includes an output circuit configured to select the packet with the highest priority value. The output circuit is configured to forward the priority value of the selected packet to a second router. The output circuit is configured to transfer the selected packet to the second router when the link between the first router and the second router is available.

7 Claims, 10 Drawing Sheets

(51) Int. Cl.
*H04L 12/865* (2013.01)
*H04L 12/933* (2013.01)
*H04L 12/875* (2013.01)

(58) Field of Classification Search
USPC .......................................... 370/412–418, 236
See application file for complete search history.

(56) References Cited

U.S. PATENT DOCUMENTS

| | | | | |
|---|---|---|---|---|
| 8,630,297 | B2* | 1/2014 | Subramanian | H04L 45/125 370/242 |
| 2002/0085548 | A1* | 7/2002 | Ku | H04L 12/46 370/386 |
| 2002/0141403 | A1* | 10/2002 | Akahane | H04L 45/00 370/389 |
| 2003/0001661 | A1* | 1/2003 | Kim | G05F 1/577 327/540 |
| 2003/0193943 | A1* | 10/2003 | Reed et al. | 370/389 |
| 2006/0053117 | A1* | 3/2006 | McAlpine et al. | 707/10 |
| 2008/0186862 | A1* | 8/2008 | Corbett | H04W 72/0486 370/237 |
| 2014/0286251 | A1* | 9/2014 | Kohli | H04B 15/00 370/329 |
| 2015/0029948 | A1* | 1/2015 | Jayaraman et al. | 370/329 |

OTHER PUBLICATIONS

Anders et al., A 4.1Tb/s Bisection-Bandwidth 560Gb/s/W Streaming Circuit-Switched 8×8 Mesh Network-on-Chip in 45nm CMOS, ISSCC 2010 Session 5, IEEE International Solid-State Circuits Conference, 2010, 3 pages, USA.

* cited by examiner

300

400

500A

→ Packet
---→ Packet Priority

500B

700

800

900

PRIORITY-BASED ROUTING

GOVERNMENT INTEREST STATEMENT

This invention was made with Government support under contract number HR0011-10-3-0007 awarded by the Department of Defense. The Government has certain rights in this invention.

TECHNICAL FIELD

The present disclosure is generally related to network-on-chip (NoC) systems. More specifically, the present disclosure is related to priority-based routing for NoC systems.

BACKGROUND

Network-on-chip (NoC) is a fabric topology widely used in multi-core processor systems. Within an on-chip network, routers may be connected to neighboring nodes. When data traffic is low, most links between pairs of routers can be available, and thus a data packet can hop from one router to another within a short period of time, such as within a clock cycle. However, when data traffic is high and links become congested, a packet may have to wait for a substantially longer time before it can transfer to a neighboring router. The delay until the transfer may become exponentially larger for each additional node between the packet and its destination.

BRIEF DESCRIPTION OF THE FIGURES

The following detailed description may be better understood by referencing the accompanying drawings, which contain specific examples of numerous objects and features of the disclosed subject matter.

DETAILED DESCRIPTION

Figure 1:
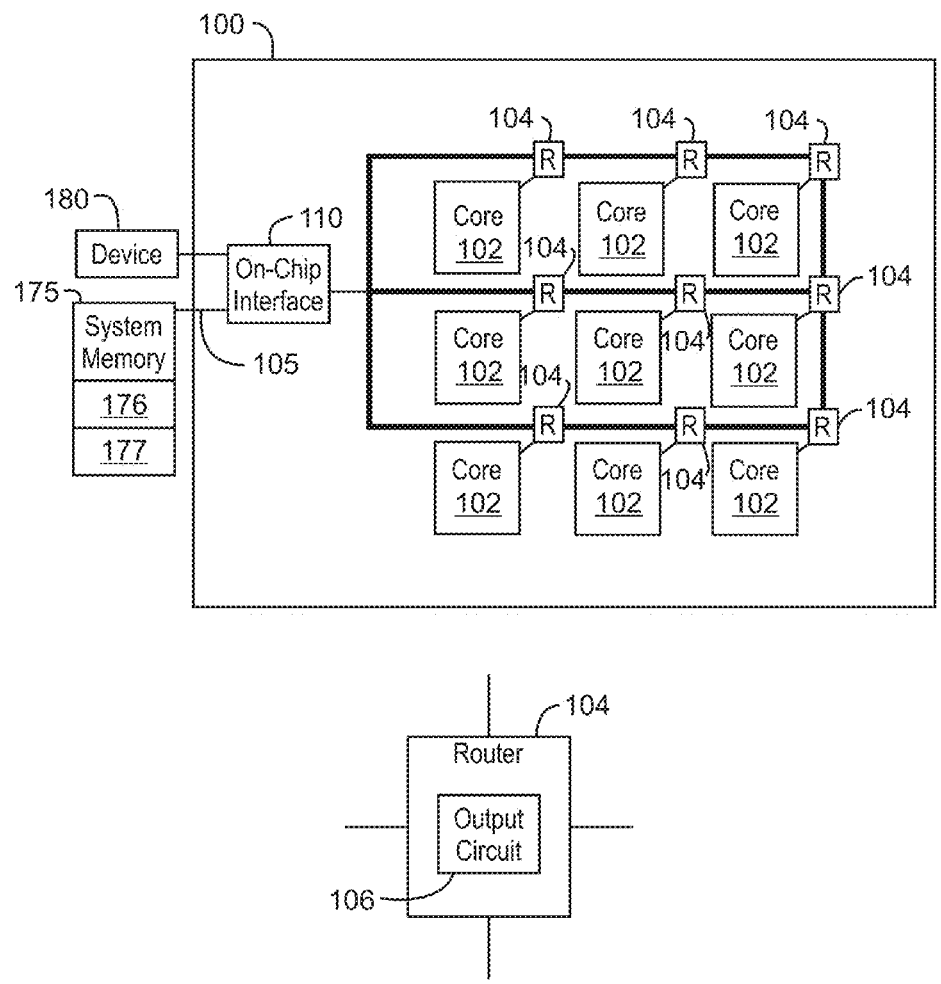
FIG. 1 is a block diagram of a multi-core processor containing a network-on-chip (NoC) system, in accordance with embodiments of the present disclosure.

The present disclosure is generally related to priority-based routing for network-on-chip (NoC) systems. Priority-based routing is a method that allows time-critical packets to reach their destination more quickly in event of congestion within the NoC. During high network traffic, a packet may have to wait several clock cycles before it is able to transfer from a first router to a second router, due to the presence of other packets competing to hop to the second router. Under such conditions, a packet—traversal latency may increase exponentially with hop count, wherein hop count is the total number of routers that a packet has to traverse to reach its destination. The embodiments discussed herein, include priority-based routing. Priority-based routing can assign a priority value to the packet such that the packet can transfer to the second router as soon as the link between the first router and the second router is available, thus reducing the wait time significantly. Under heavy congestion, even when a higher priority packet is blocked at a router, its priority information may be forwarded to down-stream routers. Using this technique, links along the higher priority packet's target propagation path may be freed in fewer clock cycles.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

FIG. 1 is a block diagram of a multi-core processor containing a network-on-chip (NoC) system, in accordance with embodiments of the present disclosure. The processor 100 includes any processor or processing device, such as a microprocessor, an embedded processor, a digital signal processor (DSP), a network processor, a handheld processor, an application processor, a co-processor, a system on a chip (SOC), or other device to execute code. The processor 100, in one embodiment, includes a plurality of cores 102, which may include asymmetric cores or symmetric cores. However, the processor 100 may include any number of processing elements that may be symmetric or asymmetric. Each of the plurality of cores can be communicatively coupled with a router 104. The routers 104 may be communicatively linked with one another in a network. In one embodiment, the plurality of routers 104 is arranged in a grid network.

The network of routers 104 may be configured to utilize priority-based routing, in order to reduce the overall amount of time to transfer packets during periods of congestion. Each router 104 includes an input port to receive one or more packets, and an output port to transmit the one or more packets. The outer 104 may include an output circuit 106 configured for priority-based routing. The output circuit 106 can be configured to receive a packet request to forward a packet to a second router along the packet's destination path. The packet may be assigned a priority value. If the router 104 receives multiple packet requests, the output circuit 106 can select the packet with the highest priority value, and forward the priority value to the second router. Forwarding the priority value allows the highest priority packet to be transferred to the second router as soon as the link between the routers is available.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In the depicted configuration, the processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
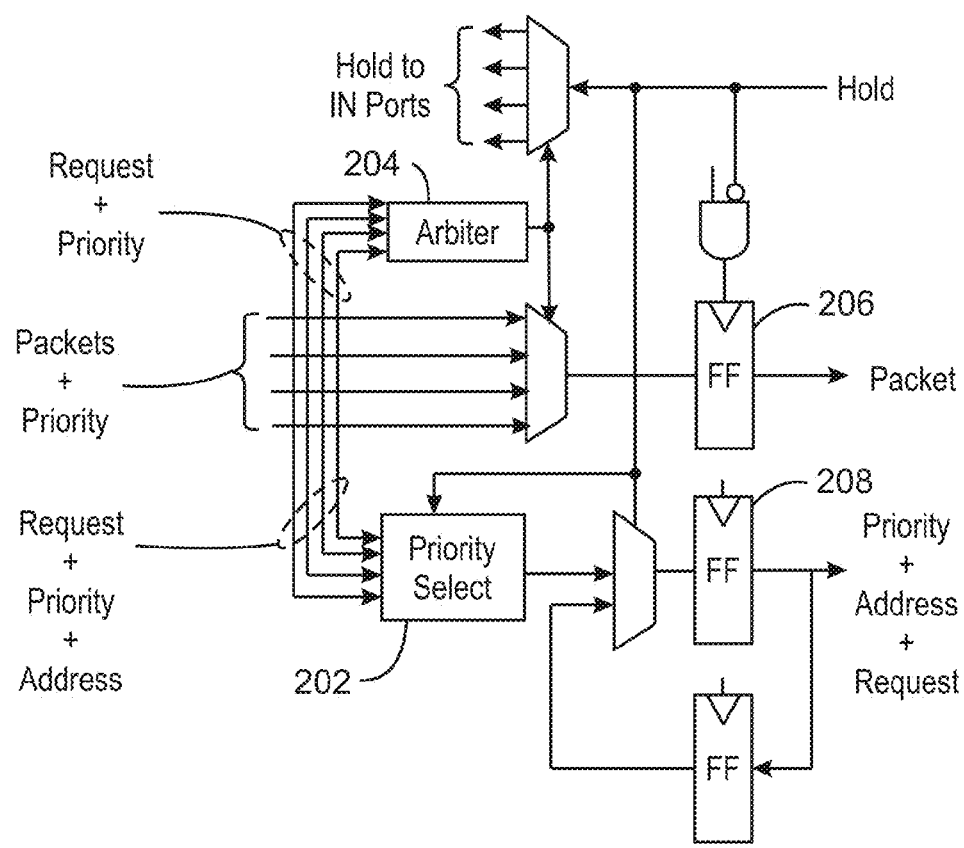
FIG. 2 is a schematic of an output circuit of a router, in accordance with embodiments of the present disclosure.

FIG. 2 is a schematic of an output circuit of a router, in accordance with embodiments of the present disclosure. The output circuit 106 includes a priority select circuit 202 and an arbiter circuit 204. The output circuit 106 also includes a number of flip-flops 206, 208, and 210.

The output circuit 106 is configured to analyze a plurality of packet requests received and select the packet request with the highest priority value to be forwarded to a second router. If the router 104 is congested by the plurality of packets, the output circuit 106 forwards the priority value to the second router such that the selected packet is sent as soon as the link between the two routers is available. The output circuit 106 may analyze information pertaining to the packets, including the priority value and destination address of each packet. The destination address describes the ultimate destination of the packet, and can be used to determine a route within the network to be taken. Thus, the destination address may be used to determine which neighboring router is to receive the packet.

In some embodiments, the output circuit 106 is configured to dynamically change the priority value of the packet. The output circuit 106 can increase or decrease the priority value based on the remaining distance (or the number of additional routers) between the packet and the destination. The output circuit 106 can increase or decrease the priority value based on the packet's latency, or number of cycles that the packet had to wait before being transferred.

The flip-flops 206, 208, and 210 can be used to pipeline digital logic within the NoC. Additionally, flip-flops 208 and 210 can also store priority information. During normal operation when there is no congestion, the address, request and priority for the selected packet are captured by the flip-flop 208. When there is congestion and the link to the second router is blocked, the address, priority and request for the blocked packet are stored in the flip flop 210.

Figure 3:
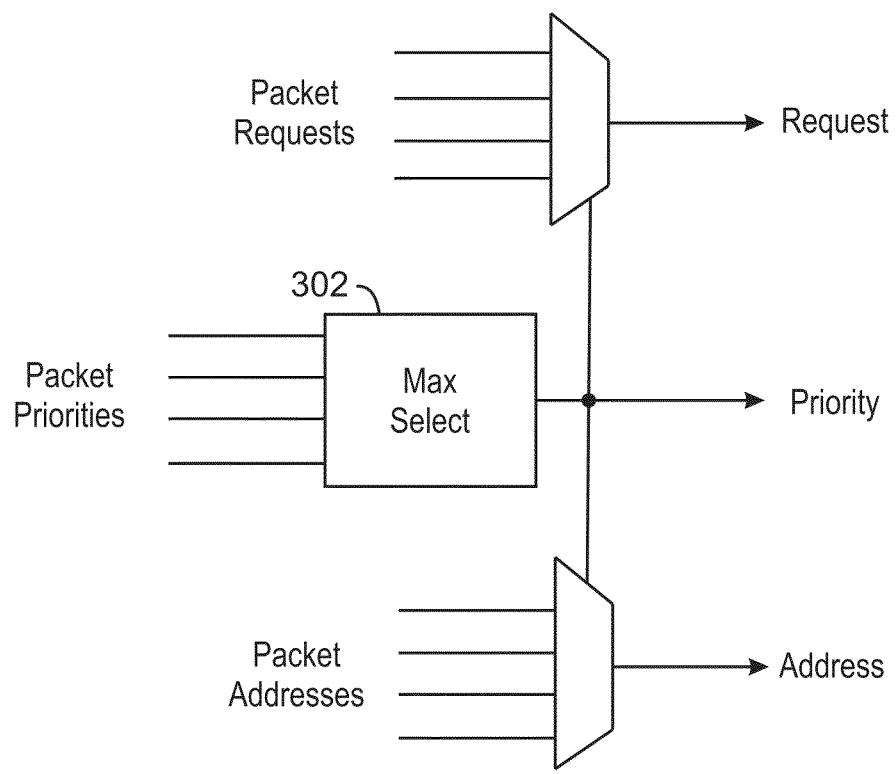
FIG. 3 is a schematic of a priority select circuit, in accordance with embodiments of the present disclosure.

FIG. 3 is a schematic of a priority select circuit 202, in accordance with embodiments of the present disclosure. The priority select circuit 202 is configured to receive information pertaining to each of the plurality of packets as inputs. The packet information can include packet requests, packet priority values, and packet addresses. The priority select circuit 202 includes a max select module 302 to select the highest packet priority value, along with the corresponding packet request and packet address.

Figure 4:
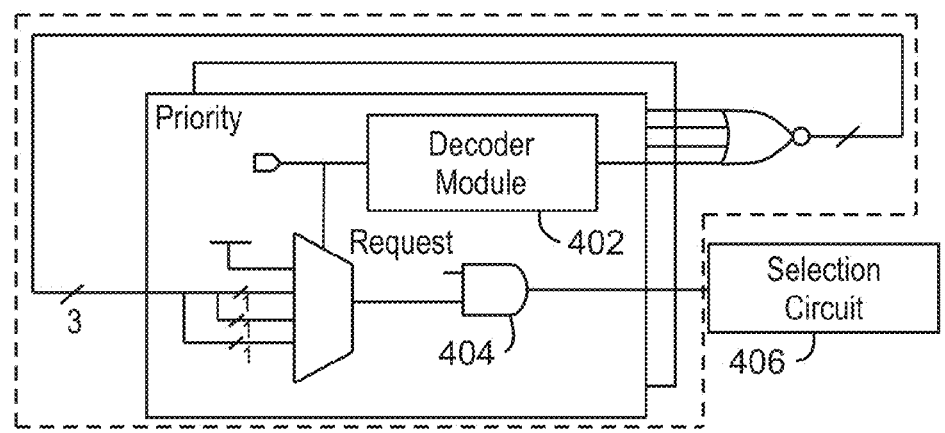
FIG. 4 is a schematic of an arbiter circuit, in accordance with embodiments of the present disclosure.

FIG. 4 is a schematic of an arbiter circuit, in accordance with embodiments of the present disclosure. The arbiter circuit 204 is configured to receive the plurality of packet requests and the corresponding priority values.

In some embodiments, the arbiter circuit 204 contains a decoder module 402. The decoder module 402 is configured to decode each priority value from a binary code to a thermometer code. The arbiter circuit 204 may include an AND gate 404 to filter out packet requests that do not have a relatively high priority value. The arbiter circuit can include a selection module 406 to select a packet request from the remaining high priority packets using a round-robin scheme.

Figure 5A:
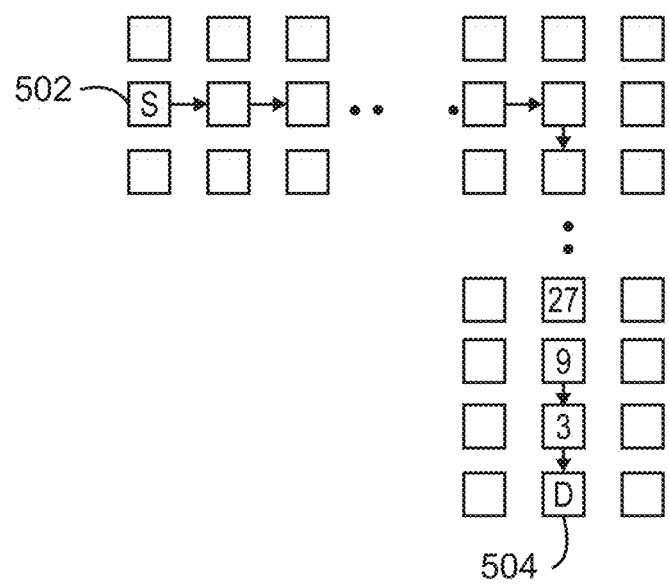
FIGS. 5A and 5B illustrate, respectively, the transfer of a packet without and with priority-based routing.
Figure 5B:
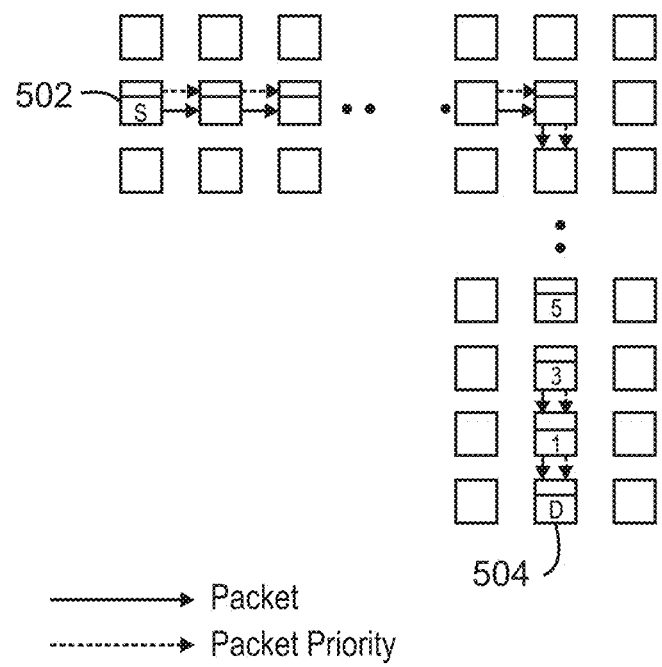

FIGS. 5A and 5B illustrate, respectively, the transfer of a packet without and with priority-based routing. The packet transfers can be performed on a network-on-chip (NoC) system as described in accordance with FIG. 1. Each router of the NoC is represented as a square node. A packet is transferred from a source node 502 to a destination 504. The path of the packet is indicated in both figures with the solid arrow line. Each node along the destination path may have additional packet requests coming in from other neighboring nodes. A number on a node represents the latency, or number of clock cycles required for a packet transfer to process.

In FIG. 5A, priority-based routing is not used. Rather, congestion at a node may be solved by using round-robin selection to determine the order is which packet requests are processed at a node. Thus, a packet may have to wait for as many as three clock cycles for competing with two other packets approaching from adjacent routers to pass through a first node before the packet itself gets forwarded to a second node. If the second node is also congested, the delay may be three times as long, as the link between the first and second nodes would only be available once every three clock cycles. Thus, latency may exponentially increase for every additional node between the packet and its destination.

In FIG. 5B, priority-based routing is used. The packet is bundled with data which assigns a priority value from a processor core at the packet's source. The priority value may be based on the source's distance from the destination node. For example, a higher priority value can be assigned to a packet with a longer delivery route. If the packet reaches a congested node, the priority value gets forwarded to the next node such that the packet is forwarded as soon as the link between the two nodes is open. Thus, the latency is significantly lessened. As seen in FIG. 5B, the latency appears to increase only linearly for every additional node between the packet and its destination.

Figure 6:
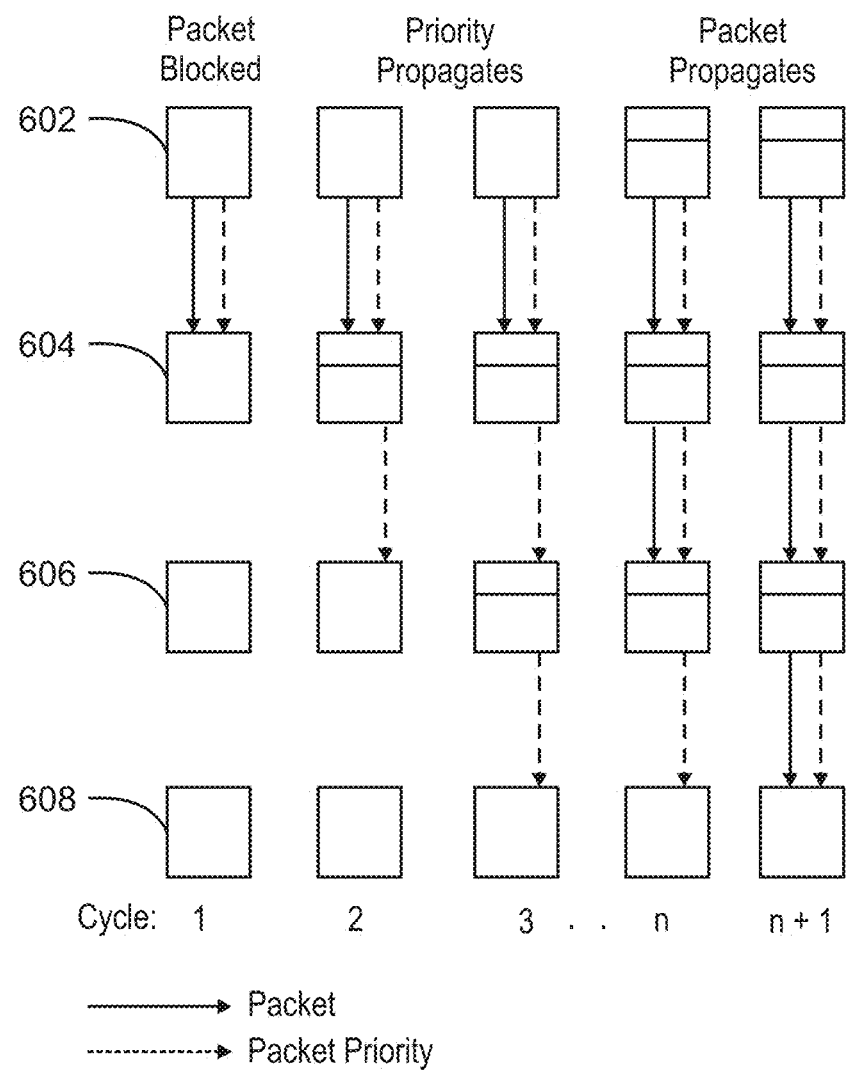
FIG. 6 illustrates the transfer of a packet over a number of clock cycles.

FIG. 6 illustrates the transfer of a packet over a number of clock cycles. The packet transfer can be performed on a network-on-chip (NoC) system as described in accordance with FIG. 1. The destination path taken by the packet is represented by square nodes 602, 604, 606, and 608.

During the first clock cycle, a packet encoded with a priority value transfers from node 602 to node 604. During the second clock cycle, the packet is unable to transfer, as the output of node 604 is congested. Instead, the priority value of the packet can propagate to the next node 606 to ensure that the packet has priority over competing packets when transferring. Over the next few clock cycles, the priority value can continue to propagate down the packet's destination path until the link between congested node 604 and node 606 is available at clock cycle n. At clock cycle n and onward, the packet propagate can down its destination path.

Figure 7:
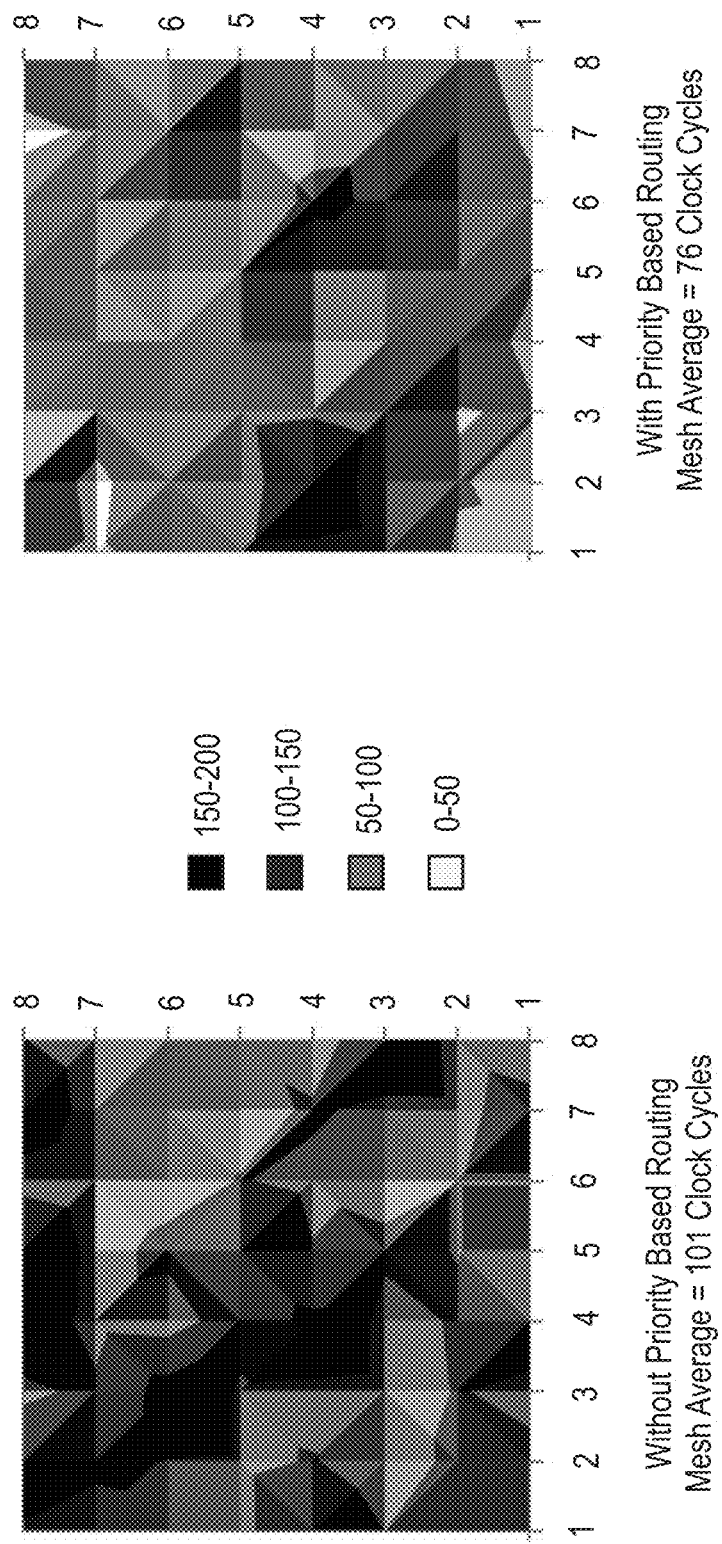
FIG. 7 is a mesh plot illustrating the effects of priority-based routing on latency in a network-on-chip (NoC).

FIG. 7 is a mesh plot illustrating the effects of priority-based routing on latency in a network-on-chip (NoC). A mesh is applied to an 8×8 network-on-chip (NoC). Data traffic is simulated with and without priority-based routing, and the maximum latency at each node is measured. As can be seen from the mesh plots, priority-based routing appears to reduce worst case latency from congestion by approximately 25% in the embodied simulation.

Figure 8:
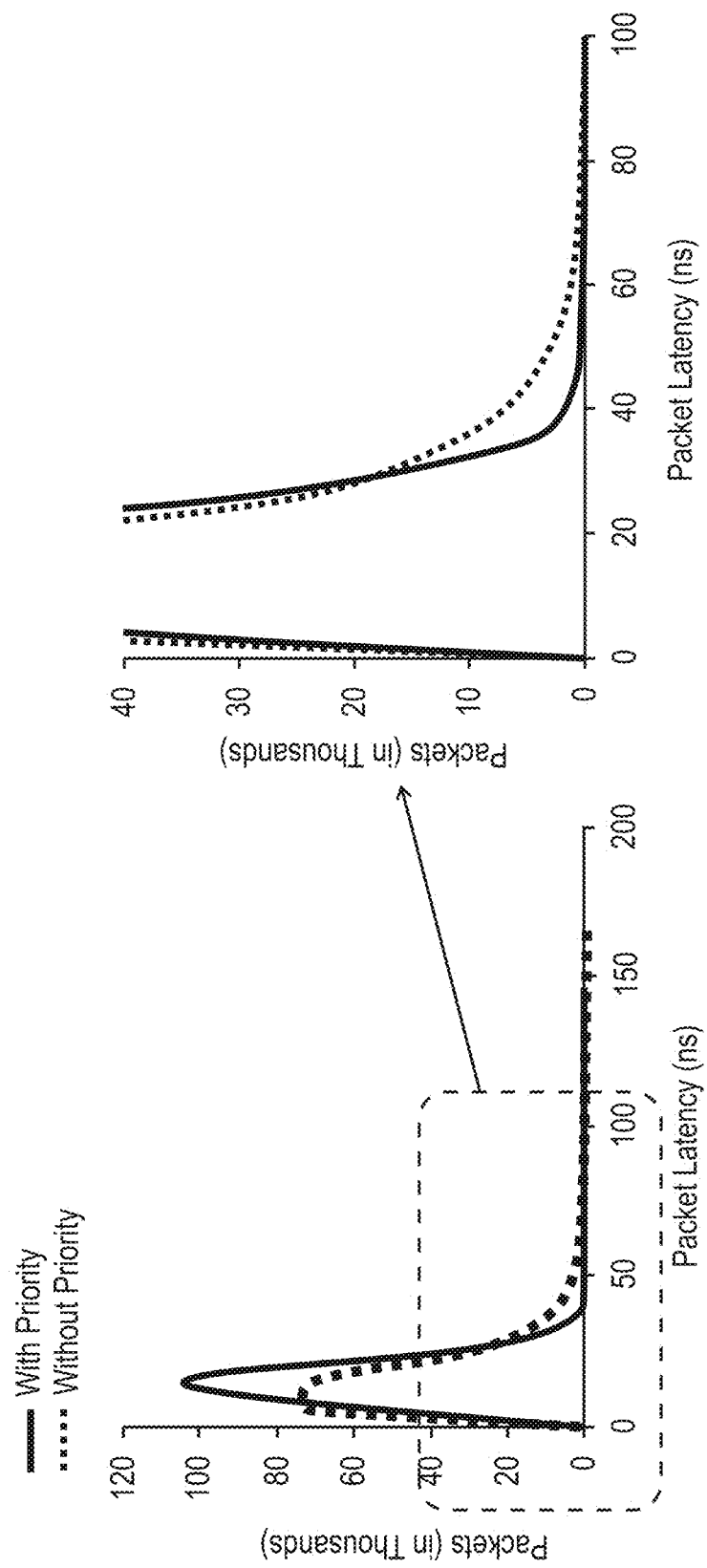
FIG. 8 is a line graph illustrating the effects of priority-based routing on latency in a network-on-chip (NoC).

FIG. 8 is a line graph illustrating the effects of priority-based routing on latency in a network-on-chip (NoC). The line graph shows the distribution of packet latencies (measured in nanoseconds) of an 8×8 network-on-chip (NoC) with and without priority. As can be seen from the line graph, the distribution of packet latencies has a lower mean but a higher standard deviation when priority-based routing is not used. When priority-based routing is used, the mean packet latency is increased, but the overall distribution is tightened, meaning that the highest latencies are significantly reduced.

Figure 9:
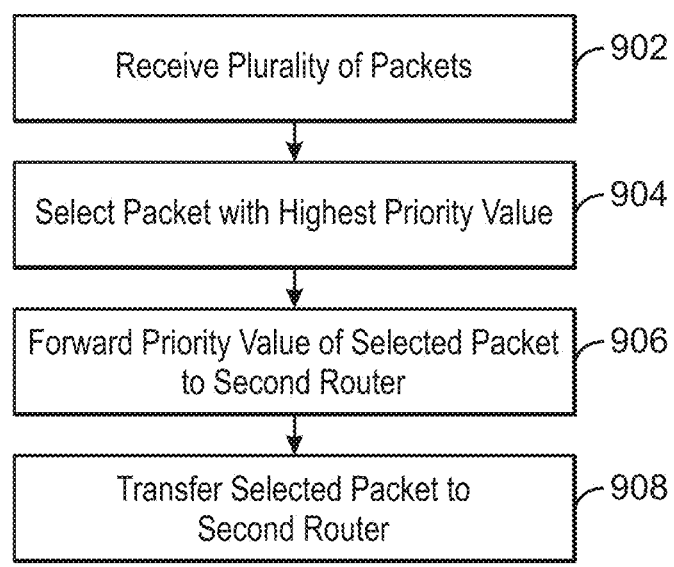
FIG. 9 is a process flow diagram of a method of priority-based routing, in accordance with embodiments of the present disclosure.

FIG. 9 is a process flow diagram of a method of priority-based routing, in accordance with embodiments of the present disclosure. The method 900 can be performed by an output circuit of a router 104 as shown in FIG. 1.

At block 902, the router receives a plurality of packets. Each packet can be assigned a priority value. In some embodiments, the assigned priority value is based upon the distance between the corresponding packet's source and destination.

At block 904, the router selects the packet with the highest priority value. In some embodiments, the router includes a priority select circuit to select a subset from the plurality of packets. The subset can include packets with relatively high priority values. In some embodiments, the router includes an arbiter circuit to decode the plurality of priority values from binary codes to thermometer codes. The arbiter circuit can select from the subset the packet with the highest decoded priority value.

At block 906, the router forwards the priority value of the selected packet to a second router. The priority value is propagated to the second router to ensure that the selected packet is to be transferred to the second router as soon as the link between the first router and the second router is available.

At block 908, the router transfers the selected packet to the second router when the link between the first router and the second router is open. The processes described in the method 900 can be repeated for the remaining packets attempting to transfer out of the first router.

Figure 10:
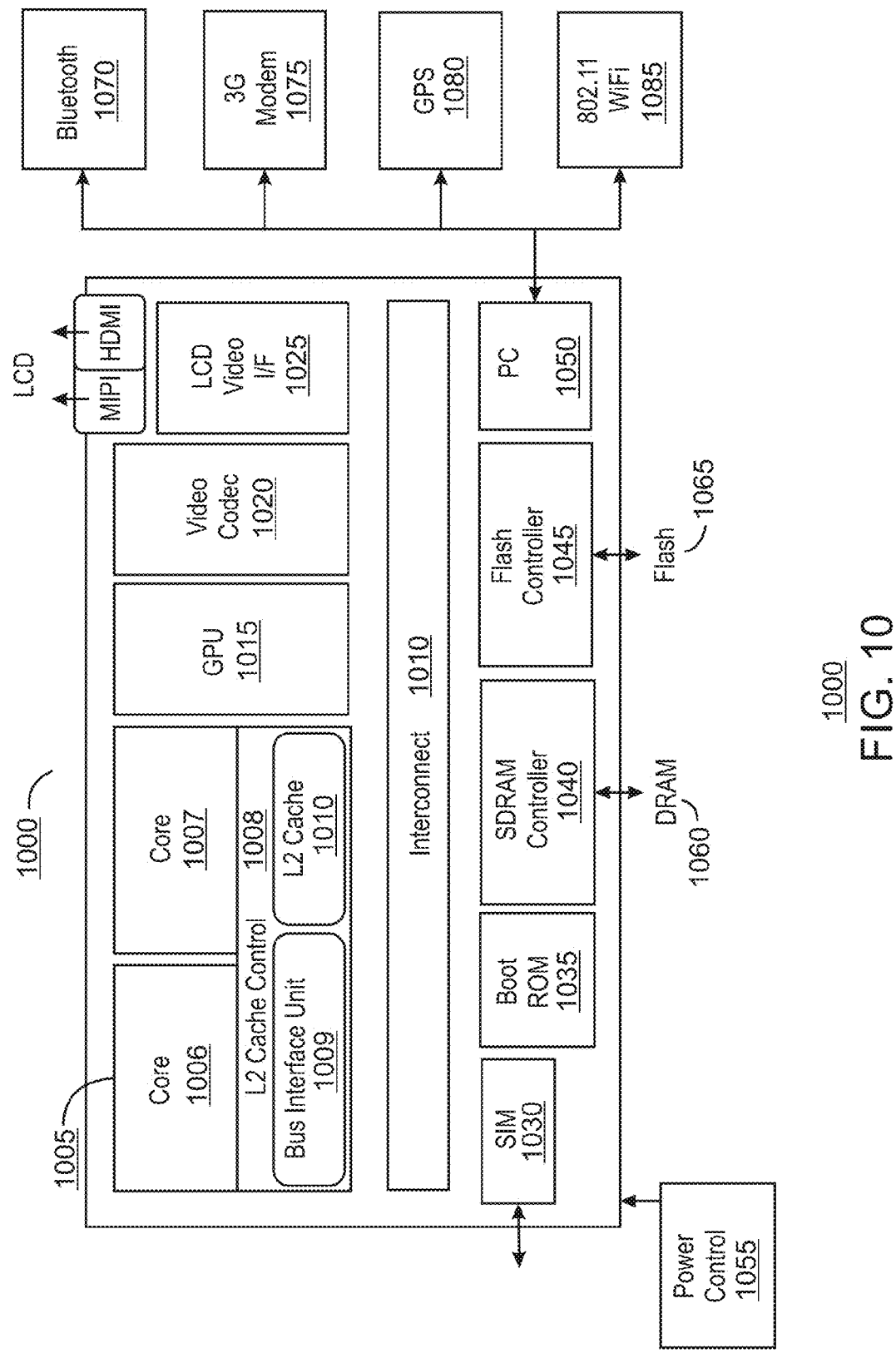
FIG. 10 is a block diagram of a system on-chip (SOC) design, in accordance with embodiments of the present disclosure.

FIG. 10 is a block diagram of a system on-chip (SOC) design, in accordance with embodiments of the present disclosure. As a specific illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Similar to the discussion above, cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described invention.

Interface 1010 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control Q1650 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the invention described herein.

In addition, the system illustrates peripherals for communication, such as a Bluetooth module 1070, 3G modem 1075, GPS 1085, and WiFi 1085. Note as stated above, a UE includes a radio for communication. As a result, these peripheral communication modules are not all required. However, in a UE some form a radio for external communication is to be included.

EXAMPLE 1

A router configured for priority-based routing is described herein. The router is configured to receive a plurality of packets, wherein each packet is assigned a priority value. The router includes an output circuit configured to select the packet with the highest priority value. The output circuit is configured to forward the priority value of the selected packet to a second router. The output circuit is configured to transfer the selected packet to the second router when the link between the first router and the second router is available.

EXAMPLE 2

A method for priority-based routing is described herein. The method includes receiving a plurality of packets in a router, wherein each packet is assigned a priority value. The method includes selecting the packet with the highest priority value. The method includes forwarding the priority value of the selected packet to a second router. The method includes transferring the selected packet to the second router when the link between the first router and the second router is open.

EXAMPLE 3

A network-on-chip (NoC) with priority-based routing is described herein. The NoC includes a plurality of processor cores, wherein each of the plurality of processor cores is communicatively coupled to a router. Each router is configured to receive a plurality of packets, wherein each packet is assigned a plurality value. Each router includes an output circuit configured to select the packet with the highest priority value. The output circuit is configured to forward the priority value of the selected packet to a second router. The output circuit is configured to transfer the selected packet to the second router when the link between the first router and the second router is available.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A network-on-chip (NoC) with priority-based routing, comprising:
    a plurality of processor cores communicatively coupled to a router, wherein the router comprises:
    an incoming port to receive a high priority incoming packet comprising a priority value, control information, and at least one other value; and
    an output port to forward the priority value and control information ahead of the at least one other value in response to congestion at the output port based on the priority value to indicate a highest priority of a plurality of incoming packets.

2. The NoC of claim 1, the router comprising a priority logic to select the particular incoming packet with the highest priority.

3. The NoC of claim 1, the router comprising an arbiter circuit to:
    decode the priority value of each packet from the plurality of incoming packets;
    select a subset of packets from the plurality of incoming packets based on the highest priorities; and
    select a particular packet from the subset of packets using a round-robin scheme.

4. The NoC of claim 3, the arbiter circuit to decode the priority of each packet from a binary code into a thermometer code.

5. The NoC of claim 1, wherein the priority value of each incoming packet is based on the distance between the packet's source and the packet's destination.

6. The NoC of claim 1, the router to dynamically change the priority of the packet based on the remaining distance to the packet's destination.

7. The NoC of claim 1, the router to dynamically change the priority of the packet based on the packet's latency.

* * * * *